United States Patent [19]
Aoki et al.

[11] Patent Number: 4,558,368
[45] Date of Patent: Dec. 10, 1985

[54] STOP CONTROL APPARATUS FOR ELECTRONIC CAMERA

[75] Inventors: Harumi Aoki; Shigeo Enomoto; Tahei Morisawa; Fumio Urano, all of Tokyo, Japan

[73] Assignee: Asahi Kogaku Kogyo Kabushiki Kaisha, Tokyo, Japan

[21] Appl. No.: 580,044

[22] Filed: Feb. 14, 1984

[30] Foreign Application Priority Data

Feb. 14, 1983 [JP] Japan .................................. 58-22496

[51] Int. Cl.⁴ ............................................. H04N 5/26
[52] U.S. Cl. .................................... 358/228; 352/141
[58] Field of Search ................. 358/228, 213; 354/446, 354/449; 352/141

[56] References Cited

U.S. PATENT DOCUMENTS 4,410,915 10/1983 Yamamoto .......................... 358/228
4,471,383 9/1984 Shiono ................................ 358/228

FOREIGN PATENT DOCUMENTS 54-99517 6/1979 Japan .................................. 358/228
59-64974 4/1984 Japan .................................. 358/228

Primary Examiner—Forester W. Isen
Assistant Examiner—L. C. Schroeder
Attorney, Agent, or Firm—Sughrue, Mion, Zinn, Macpeak & Seas

[57] ABSTRACT

A stop control apparatus for an electronic camera capable of performing both still picture photographing and motion picture (video) photographing operations. A video exposure control circuit and a still exposure control circuit produce first and second operating signals during motion picture and still picture photographing operations, respectively. A selected one of the signals is applied to operate an electromagnetic diaphragm control mechanism composed of an electronic drive device mechanically coupled to operate the aperture blades of the camera. An aperture opening regulator determines the aperture opening amount in accordance with a selected aperture value, with the regulating means operating by producing a force which acts against the force produced by the electromagnetic drive device.

5 Claims, 9 Drawing Figures

STOP CONTROL APPARATUS FOR ELECTRONIC CAMERA

BACKGROUND OF THE INVENTION

The present invention relates to an electronic camera which can take both still and motion pictures. More particularly, the invention relates to a stop control apparatus, hereinafter referred to for simplicity as a stop, for use in an electronic camera.

In an electronic camera, an image pickup device such as a solid-state image pickup element is used to obtain an electrical signal varying in magnitude according to the brightness of an object being imaged. The electrical signal thus obtained is stored on a magnetic disc or in a semiconductor memory. The electronic camera is advantageous in that it requires no photographing film which must be developed chemically, and the picture can be reproduced quickly with a television set. A variety of such electronic cameras have been proposed in the art to replace conventional cameras using film.

As mentioned above, an electronic camera uses an image pickup device instead of a film. However, the other essential components of the electronic camera, such as an exposure control device, can be the same as those of a conventional still-type film camera. That is, in an electronic camera, the exposure can be controlled utilizing a photometer, shutter, and stop of the same general construction as in a still camera.

An electronic camera, as described before, uses a lens and image pickup device. Therefore, if the electronic camera is coupled to a motion picture recording device such as a video tape recorder instead of a still picture recording device, it is theoretically possible to use it as a video camera for taking motion pictures. However, in performing video photographing operations with such an electronic camera, the degree of opening of the aperture must be continuously adjusted in accordance with the brightness of the object at all times because the exposure time of the image pickup device is fixed to a value corresponding to one frame period or one field period. Accordingly, in a conventional video camera, a diaphragm opening and closing mechanism connected to an electromagnetic drive device such as a galvanometer is provided, and a luminance signal corresponding to the average brightness of the object is applied to the electromagnetic drive device thereby to control the diaphragm. On the other hand, in a conventional still camera, the stop is implemented with a mechanical arrangement using an aperture ring. Such a mechanism cannot continuously control the aperture in response to an electrical signal, and hence such a mechanism cannot be applied to an electronic camera capable of both motion and still picture photographing.

Furthermore, the above-described electromagnetic diaphragm control device employed in a conventional video camera cannot maintain a preset aperture value, as can be done by a conventional aperture-priority still camera, and cannot automatically set an aperture value in accordance with a selected shutter speed, as can be done by a shutter-priority still camera. Therefore, if such a device were used as a stop for a still camera, it could not perform all the aperture control functions which conventional aperture priority and shutter priority cameras perform.

In other words, it is extremely difficult for an electromagnetic diaphragm control device to set aperture blades to a desired position instantly when the shutter is operated, and neither the stop control apparatus of a video camera nor that of a still camera can satisfactorily function as a stop control apparatus in an electronic camera which is capable of both motion and still picture photographing.

SUMMARY OF THE INVENTION

In view of the foregoing, the invention provides a stop control apparatus for an electronic camera for taking not only motion pictures but also still pictures in which the stop has an electromagnetic diaphragm control mechanism controlled by a video exposure control circuit which operates while taking motion pictures, and a still exposure control circuit which operates while taking still pictures. The stop control apparatus includes aperture value setting means operated for still picture taking, and aperture opening regulating means for regulating the aperture opening according to an aperture value set against the force of an electromagnetic drive device of the electromagnetic diaphragm control mechanism. The aperture opening regulating means moves to a position where it will not interfere with the control mechanism when the still picture taking mode is switched over to the motion picture taking mode.

DESCRIPTION OF THE PREFERRED EMBODIMENTS

The invention will now be described with reference to preferred embodiments shown in the accompanying drawings.

Figure 1:
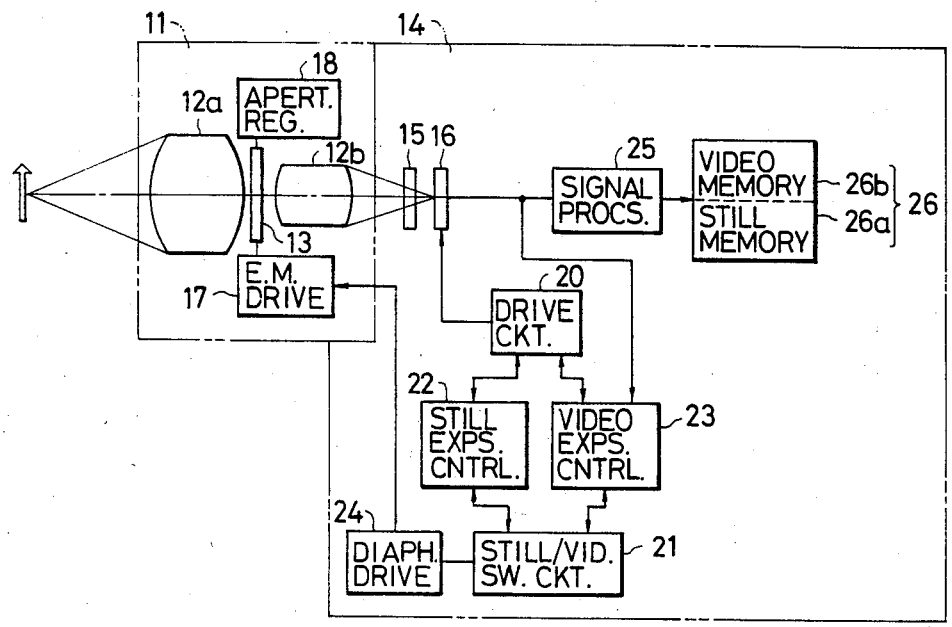
FIG. 1 is a block diagram showing the basic arrangement of a stop control apparatus of the invention applied to an electronic camera.

FIG. 1 is a block diagram showing the basic configuration of an electronic camera according to the invention. In the photographing lens 11 of the camera, a diaphragm opening and closing mechanism 13 is disposed at a pupil position between lens elements 12a and 12b. In the camera body 14, a shutter 15 and an image sensor 16 are arranged on the optical axis of the photographing lens 11.

The diaphragm opening and closing mechanism 13 is coupled to an electromagnetic drive device 17, such as a galvanometer, with which the position of the diaphragm is controlled. The mechanism 13 is provided with an aperture opening regulator 18 for controlling the opening of the aperture. The regulator 18 works against the force of the electromagnetic drive device 17. The aperture opening regulator 18 is operated in the still picture mode in association with the diaphragm control mechanism to determine the degree of opening of the aperture according to a specified aperture value.

Discharging, reading and storing the charges which are stored in the image sensor 16 are carried out under the control of an image sensor drive circuit 20, a still exposure control circuit 22 and a video exposure control circuit 23. The operational one of the still exposure control circuit 22 and video exposure control circuit 23 is selected by a still/video switching circuit 21 in cooperation with a diaphragm drive circuit 24. The electronic camera of FIG. 1 further includes a signal processing circuit 25 and a memory device 26 having a still memory unit 26a and a video memory unit 26b.

Figure 2:
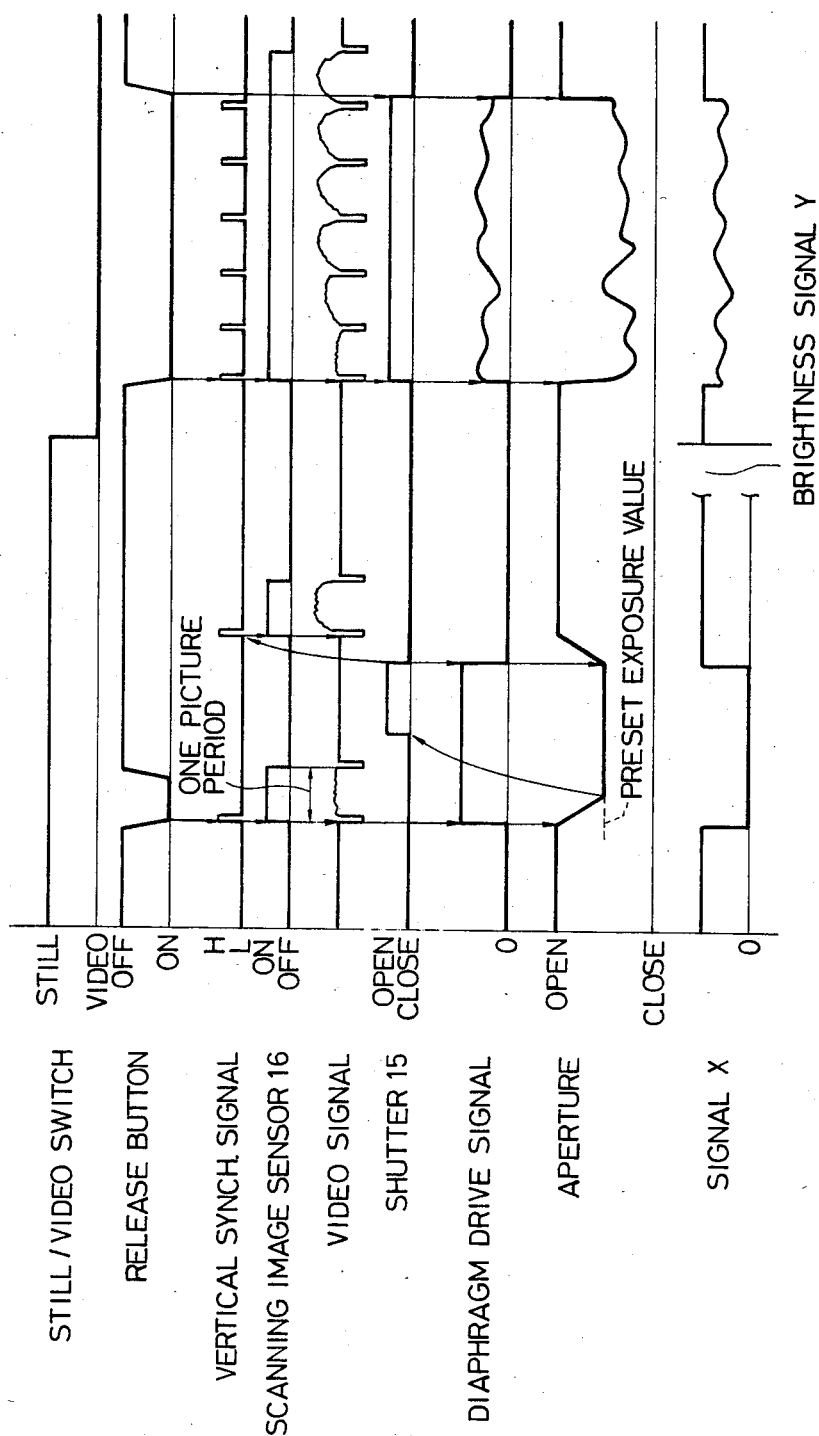
FIG. 2 is a timing chart showing operating characteristics of the apparatus of FIG. 1.

FIG. 2 is a timing chart illustrating an example of the operation of the electronic camera according to the invention shown in FIG. 1.

When it is desired to take a still picture, the still picture photographing mode is selected by the still/video switching circuit 21. That is, the still exposure control circuit 22 is selected. At the same time, in the memory device 26, the still memory unit 26a is selected. Then, when the release button (not shown) is depressed, a vertical synchronizing signal is generated, whereupon the image sensor drive circuit 20 scans the image sensor 16 to discharge unwanted charges accumulated therein. At the same time, the diaphragm control mechanism 13 starts a lens stopping operation by moving the diaphragm from the fully open position towards the minumum position. The aperture opening regulator 18 regulates the aperture value against the electromagnetic drive force which is produced in the lens stopping operation. When the aperture value reaches a preset value, the lens stopping operation of the mechanism 13 is halted, and the preset aperture value is maintained.

Next, the shutter 15, which is controlled by the still exposure control circuit 22, is opened and the image sensor 16 is exposed to light. When an appropriate exposure time calculated by the still exposure control circuit 22 has passed, the shutter 15 is closed. Thereafter, the vertical synchronizing signal is produced again so that the image sensor 16 is scanned for one field period or one frame period. As a result, signals corresponding to the charges accumulated in the image sensor 16 during the exposure are applied to the signal processing circuit 25. A video signal provided by the signal processing circuit 25, after being suitably processed, is stored in the still memory unit 26a, which may be implemented with a magnetic disc or a semiconductor memory. On the other hand, when the shutter 15 is closed, the diaphragm drive circuit 24 suspends the application of the diaphragm drive signal to the electromagnetic drive device 17 so that the diaphragm control mechanism 13 is returned to the released state again.

When the still/video switching circuit 21 selects the video mode, the video exposure control circuit 23 is selected, and in the memory device 26 the video memory unit 26b is selected. In addition, the shutter 15 is held open. When the release button is depressed, the vertical synchronizing signal B is produced continuously, and hence the image sensor drive circuit 20 scans the image sensor 16 continuously. Continuous video signals provided by the signal processing circuit 25 are stored in the video memory unit 26b for providing motion pictures.

During the video photographing operation, the output of the image sensor 16 is applied to the video exposure control circuit 23 where a luminance signal Y corresponding to the average brightness of the object's image is extracted. The output of the video exposure control circuit is applied, as the diaphragm drive signal, through the still/video switching circuit 21 and the diaphragm drive circuit 26 to the electromagnetic drive device 17. Thus, the aperture opening set by the diaphragm control mechanism 13 is continuously controlled according to the luminance of the imaged scene. In this operation, the aperture opening regulator 18 is moved to a position where it will not interfere with the mechanism 13 when the video mode is selected as described above so that the regulator 18 will not obstruct the continuous control operation of the mechanism 13.

Figure 3:
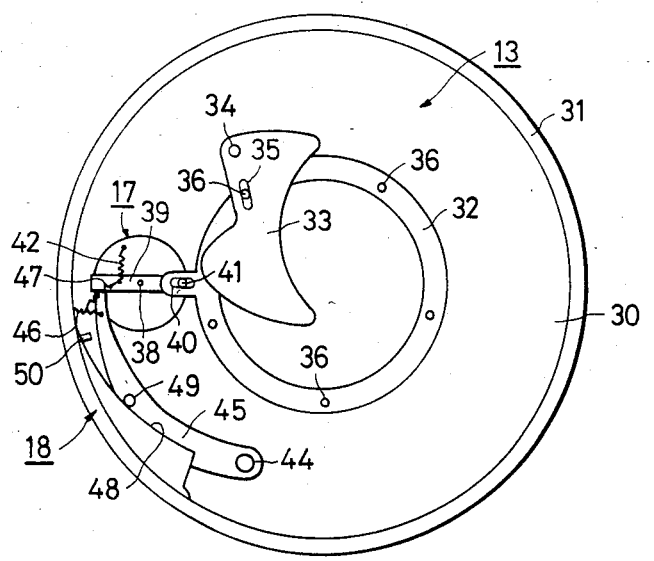
FIG. 3 is a front view showing essential components of examples of a diaphragm control mechanism, an electromagnetic drive device and an aperture opening regulator.
Figures 4A, 4B, 4C:
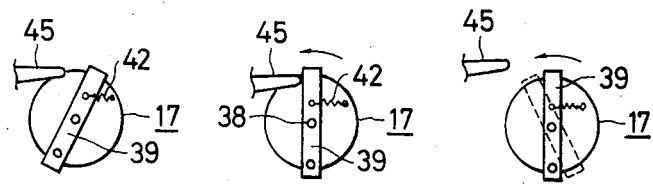
FIGS. 4A to 4C are plan views showing operating states of components of the device of FIG. 3.
Figure 5:
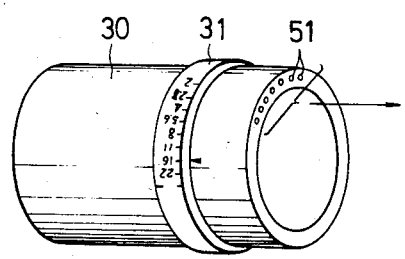
FIG. 5 is a perspective view of a lens equipped with a stop control apparatus according to the invention.

FIGS. 3, 4 and 5 show examples of the diaphragm control mechanism 13, the electromagnetic drive device 17 and the aperture opening regulator 18 which are employed in the electronic camera having the above-described arrangement. In FIG. 3, reference numeral 30 designates a stationary cylinder of a lens barrel, which is shown with an exaggerated diameter for convenience in illustration. An aperture value setting ring 31 is rotatably mounted on the stationary cylinder 30, and an aperture blade ring 32 is rotatably fitted at the pupil position. Each aperture blade 33 has a pivot pin 34, the outer end which is secured to the stationary cylinder 30. The aperture blade 33 further has an elongated hole 35 at the middle part in which a rotary pin 36 attached to the aperture blade ring 32 is fitted. With this arrangement, when the aperture blade ring 32 is turned counterclockwise in FIG. 3, the blade 33 is moved to increase the aperture, the aperture and when the ring 32 is turnned clockwise, the blade 33 is moved to reduce the aperture.

In practice, a plurality of blades 33 and the rotary pins 3 are provided. However, only one blade 33 is shown in FIG. 3 for convenience in description of the operation of the blades.

The electromagnetic drive device 17 has a rotating shaft 38 which is turned counterclockwise when an electromagnetic force is applied thereto, and a rotating plate 39 secured to the rotating shaft 38. An interlocking pin 40 fixed to the rotating plate 39 is fitted in an interlocking groove 41 formed in a protrusion which extends radially from the aperture blade ring 32. The rotating plate 39 is urged by a tension spring 42 to turn clockwise in FIG. 3. Therefore, before the electromagnetic drive device 17 is excited, the rotating plate 19 is turned clockwise in FIG. 3 and set by the elastic force of the spring 42 in the position shown in FIG. 4A. As the rotating plate is turned in this manner, the aperture blade ring 32 is turned counterclockwise by means of the interlocking pin 40 and the interlocking grooves. As a result, the aperture blades 33 are held open. When the electromagnetic drive device 17 is excited, the electromagnetic force turns the rotating shaft 38 and the rotating plate 39 clockwise against the elastic force of the spring 42, as a result of which the aperture blades 33 are turned to stop down the lens.

The apeture opening regulator 18 is used to limit the movement of the rotating plate 39 of the electromagnetic drive device 17, thereby setting an aperture value for still picture taking. The stationary cylinder 30 has an aperture opening regulating arm 45 which is swingable about a pin 44. The end of the arm 45 can abut against the rotating plate 39. However, it is urged to turn counterclockwise (in FIG. 3) by a tension spring 46; that is, it is urged away from the rotating plate 39. Accordingly, the maximum rotational position of the rotating plate 39 can be regulated according to the position of the aperture opening regulating arm 45.

A cam 48 is provided on the inner surface of the aperture value setting ring 31. The cam 48, which abuts against a regulating pin 49 fixed to the aperture opening regulating arm 45, is used to regulate the position of the arm 45 against the force of the tension spring 46. Aperture values for taking still pictures and "VIDEO", used for still and motion picture photographing, respectively, are marked on the aperture value setting ring 31. When a desired aperture value is set by turning the ring 31, the cam 48 pushes the pin 49 so that the arm 45 is moved. The cam 48 is so shaped that the position of the arm 45 corresponds to the designated aperture value. Accordingly, when the rotating plate 39 is turned counterclockwise (in FIG. 3) from the fully open position used for taking still pictures, the maximum amount of rotation thereof is regulated by the aperture opening regulating arm 45 according to the preset aperture value (see FIG. 4B). A step 50 formed on the cam 48 corresponds to the "VIDEO" mark. When the regulating pin 49 strikes the step 50, the arm 45 is turned to a position where it will not interfere with the rotating plate 39, and therefore the rotation of the rotating arm 38 and the rotating plate 39 will not be obstructed by the arm 45 (FIG. 4C). That is, the rotating plate 39 can then turn freely between a position corresponding to the fully open position (indicated by the solid line) and a position corresponding to the minimum aperture setting (indicated by the broken line), and hence the aperture blades can be continuously and smoothly moved by the video aperture signal.

The above-described arrangement allows a so-called full-aperture metering operation to be performed in the still photographing mode. In a case where a full aperture metering operation is not required, for the aperture to be made fully open when no electric power is supplied to the electromagnetic drive device 17, the direction of the aperture blades 33 should be reversed so that the blades 33 are fully open when the aperture blade ring 32 is turned clockwise. In this case, in taking still pictures the still exposure control circuit 22 applies a diaphragm opening signal through the still/video switching circuit 21 and the electromagnetic drive device 17 to the aperture control mechanism 13 so that the latter opens the aperture blades 33 accordingly. The aperture opening regulator controls the aperture value in such a manner that the maximum opening is set in accordance with the selected aperture value.

In FIG. 5, reference numeral 51 designates contacts which are provided on the lens mount in the case an interchangeable lens arrangement is employed. Electrical signals for driving the electromagnetic drive device 17 are transmitted through the contacts 51 from the camera body side. Therefore, the electronic camera of the invention, unlike a still camera, needs no mechanical diaphragm interlocking mechanism.

Figure 6:
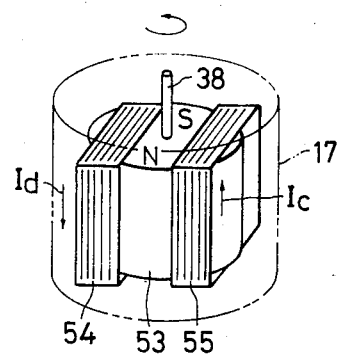
FIG. 6 is a perspective view showing an example of an electromagnetic drive device used in the apparatus of FIG. 3.

FIG. 6 shows an example of the electromagnetic drive device 17. The device 17 is configured as a so-called "moving-cone" type motor. A drive coil 54 and a control coil 55 are wound on a cylindrical permanent magnet 53 magnetized as shown in FIG. 6 with the coils 54 and 55 being arranged parallel to one another and symmetrically with respect to the rotary shaft 38 of the permanent magnet 53. The permanent magnet 53, the drive coil 54 and the control coil are surrounded by a housing which serves as the yoke. When a current $I_d$ flows in the drive coil 54, the electromagnetic force so generated causes the rotary shaft 38 to turn counterclockwise in FIG. 6. The speed of rotation of the rotary shaft 38 depends upon the direction and magnitude of a current $I_c$ flowing in the control coil. Therefore, the speed of rotation of the rotary shaft 38 can be adjusted to a suitable value.

Figure 7:
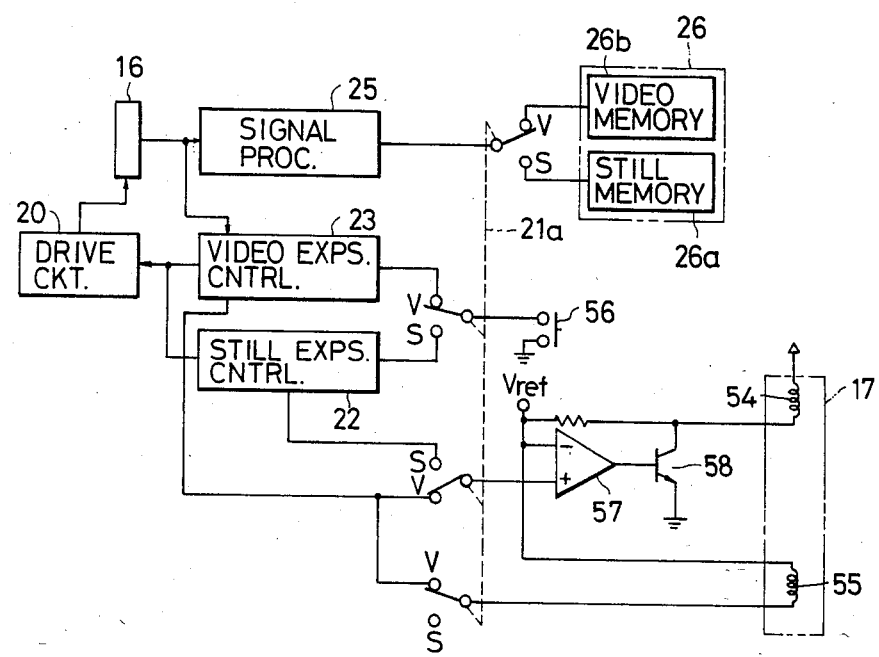
FIG. 7 is a circuit diagram, partly as a block diagram, showing an example of a drive circuit of a stop control apparatus of the invention.

FIG. 7 shows an example of a circuit used for driving the above-described electromagnetic drive device 17. The still/video switching circuit 21 in this example includes a changeover switch 21a, which is a ganged four-pole double-throw switch which may be implemented with semiconductor switching devices, provided to switch between the still exposure control circuit 22 and the video exposure control circuit 23; the memory units 26a and 26b in the memory device 26; and the drive coil 54 and the control coil 55. When the armature of the changeover switch 32a is at the position S (still), by turning on a release switch 56, the still exposure control circuit 22 is operated to apply the vertical synchronizing signal as shown in FIG. 2 to the image sensor drive circuit 20 so that the image sensor 16 is scanned to output a signal corresponding to the charge pattern accumulated therein. At the same time, the still exposure control circuit 22 applies a signal Z as shown in FIG. 2 to a comparator 57. Since the signal X has an amplitude at that instant lower than that of a fixed comparison signal $V_{ref}$, the output of the comparator 57 will be at the L (low) level, and hence a transistor 58 is rendered conductive. Accordingly, current flows in the drive coil 54 of the electromagnetic drive device 17, and hence the diaphragm control mechanism 13 is operated to stop the lens. In this case, no current flows in the control coil 55, and therefore the lens stopping operation is carried out at a high speed, as is suitable for still picture photographing operations. After exposure has been accomplished, the level of the signal X becomes higher than that of the comparison signal $V_{ref}$, and therefore the output of the comparator 57 is raised to the H (high) level and the transistor 58 is rendered nonconductive. As a result, very little current flows in the drive coil 54 and the diaphragm is opened again. The output of the image sensor 16, after being processed by the signal processing circuit 25, is stored in the still memory unit 26a.

When the movable contacts of the changeover switch 21a are at the position V (video), upon turning on the release switch 56, the video exposure control circuit 23 is operated to apply the vertical synchronizing signal as shown in FIG. 2 to the image sensor drive circuit, whereupon conditions are established for a motion picture photographing operation to be carried out. In this operation, the output of the image sensor 16 is applied to the video exposure control circuit 23 which extracts therefrom a luminance signal Y corresponding to the average brightness of the object. The luminance signal Y is applied to the comparator 57. At the same time, current flows in the control coil 55 via the changeover switch 21a and is fed back to the comparator 57 so that the speed of rotation of the electromagnetic drive device 17 is adjusted. The comparator 57 applies a current through the transistor 58 to the drive coil 54 in a magnitude determined by the luminance signal Y. Therefore, the diaphragm is operated at a relatively low speed suitable for the video photographing operation. A motion picture signal having a correct exposure is obtained in this manner. The motion picture signal thus obtained, after being processed by the signal processing circuit 25, is stored in the video memory unit 26b.

As is apparent from the above description, with the electronic camera stop control apparatus according to the invention, automatic exposure operations can be carried out for both still and video photographing. Accordingly, an electronic camera capable of serving both as a still camera and as a motion picture video camera is realized. For still photographing, fully open metering can be carried out, and therefore the electronic camera can be readily operated in the same manner as a conventional still camera. Moreover, in the case where the electronic camera is provided with interchangeable lenses, it is unnecessary to provide a mechanical interlocking mechanism between the lens and the body because the diaphragm is operated electromagnetically, and therefore the overall arrangement of the apparatus can be simplified. A lens incorporating the stop control apparatus according to the invention can be used in a conventional video camera, and thus is advantageous from a viewpoint of interchangeability.

We claim:

1. A stop control apparatus for an electronic camera having aperture blades and which is capable of selectively performing a still picture photographing operation and a motion picture photographing operation comprising:
   a video exposure control circuit for producing a first operating signal during said motion picture photographing operation;
   a still exposure control circuit for producing a second operating signal during said still picture photographing operation;
   an electromagnetic diaphragm control mechanism comprising an electromagnetic drive device coupled to said aperture blades;
   means for coupling a selected one of said video exposure control circuit and said still exposure control circuit to said electromagnetic diaphragm control mechanism;
   aperture value setting means operating during said still picture photographing operation; and
   an aperture opening regulating means for determining an aperture opening in accordance with a selected aperture value, said regulating means producing a force acting against a force produced by said electromagnetic drive device of said electromagnetic diaphragm control mechanism said aperture opening regulating means comprising means for moving said regulating means to a position where said aperture opening regulating means will not interfere with said electromagnetic aperture control mechanism when said still picture photographing operation is switched over to said motion picture photographing operation.

2. The stop control apparatus for an electronic camera as claimed in claim 1, wherein said aperture value setting means comprises an aperture value setting ring rotatably mounted on a lens barrel, said aperture value setting ring serving also as means for switching said still picture photograhing operation over to said motion picture photographing operation.

3. The stop control apparatus for an electronic camera as claimed in claim 1, wherein said aperture blades coupled to said electromagnetic diaphragm control mechanism are urged to open, and an electromagnetic force of said electromagnetic drive device acts to close said aperture blades against a force of urging said aperture blades to open.

4. The stop control apparatus for an electronic camera as claimed in claim 1, wherein said electromagnetic drive device comprises a moving-cone type motor having a drive coil and a control coil wound on a cylindrical permanent magnet, said drive and control coils being arranged parallel to one another and arranged symmetrically with respect to a rotary axis of said permanent magnet.

5. The stop control apparatus for an electronic camera as claimed in claim 4, wherein said coupling means comprises an electronic switch.

* * * * *